Dec. 1, 1964 A. J. DEERFIELD 3,159,739

FAST MULTIPLY APPARATUS

Filed Jan. 24, 1961 2 Sheets-Sheet 1

INVENTOR.
ALAN J. DEERFIELD
BY Henry L. Hanson
ATTORNEY

Dec. 1, 1964
A. J. DEERFIELD
3,159,739
FAST MULTIPLY APPARATUS
Filed Jan. 24, 1961
2 Sheets-Sheet 2

INVENTOR.
ALAN J. DEERFIELD
BY Henry L. Hanson
ATTORNEY

United States Patent Office 3,159,739
Patented Dec. 1, 1964

3,159,739

FAST MULTIPLY APPARATUS

Alan J. Deerfield, Franklin, Mass., assignor to Honeywell Inc., a corporation of Delaware Filed Jan. 24, 1961, Ser. No. 84,609
2 Claims. (Cl. 235—164)

A general object of the present invention is to provide a new and improved data manipulating apparatus useful particularly in connection with the performance of arithmetical operations. More specifically, the present invention is concerned with a new and improved apparatus for manipulating a pair of numbers so that the number of steps to be performed in the manipulation will be minimized to thereby decrease the time in which the operation can be performed.

In data processing systems, the carrying out of certain mathematical functions can be extremely time-consuming due to the large number of steps required in order to effect the desired operation. Multiplication of a pair of binary numbers is typical of the type of time-consuming operation in point. Considering a multiplication operation more specifically, this operation is normally carried out in the form of a series of individual steps wherein a series of partial products are accumulated by adding the multiplicand in accordance with bits making up the multiplier. After each partial product has been generated, it is necessary that there be a shifting of the resultant partial product in preparation for the insertion of the multiplicand under the control of the next multiplier bit. This process will continue until all bits of the multiplier have been sensed. It will thus be seen that the basic number of steps required in each multiplication operation will be twice the number of bits associated with the multiplier, that is, an add step and a shift step for each bit.

It has been found, in accordance with the principles of the present invention, that by scanning in advance more of the multiplier than the multiplier bit which is in direct control of the multiplication operation, it is possible to minimize the number of steps actually required to perform the multiplication operation. This advance scanning of the multiplier bits permits the circuitry to interpret a portion, or all, of the multiplier in a modified form so that the number of arithmetical operations to be performed in the multiplication may be minimized.

It is therefor a further more specific object of the invention to provide a new and improved data manipulating apparatus for a pair of numerical factors wherein at least one of those factors is reinterpreted in another form such that a data processor can perform the manipulation using a minimum number of steps.

In the process of multiplication wherein the multiplier is normally examined a digit at a time, it is possible that certain bit combinations will take the maximum number of steps required in order to carry out the desired multiplication. A typical example of such is the appearance of a series of "ones" in the multiplier which normally call for the multiplier to effect the generation of a partial product with respect to each "one" as well as a shifting operation. Thus, for example, should a series of four "ones" appear in the multiplier, these four "ones" would represent in binary code the decimal number 15. The number 15 may be split into two separate factors having a combined numerical significance equal to 15, but wherein each of the factors is different. Thus, the number 15 may be represented by the number 16−1. It will be apparent that this number 15 may then be represented in binary terms as a 1000T where T equals (−1). The multiplication operation then becomes one wherein the multiplier would be interpreted in the form of two "ones," one of which is negative and three "zeros." It will be apparent that as the number of "ones" in a series increases in the multiplier, the greater advantage can be taken in the reinterpretation of the multiplier.

A further object of the invention is therefore to provide a new and improved apparatus for multiplying a pair of binary numbers wherein means are provided for interpreting selected combinations of bits in the multiplier in modified form so as to minimize the number of steps required to carry out the multiplication operation.

A still further more specific object of the present invention is to provide a new and improved multiplication control apparatus for a data processor wherein means are provided for sensing a series of "ones" in the multiplier and this series of "ones" is reinterpreted as a "one" of the next higher binary power minus one.

Still another object of the present invention is to provide a new and improved multiplication apparatus for a data processor wherein sensing means are provided for examining the multiplier and this sensing means is effective to selectively control the subtraction, shifting, and addition of the multiplicand in a product accumulator.

Still another object of the invention is to provide a new and improved multiplication apparatus for a pair of binary numbers wherein means are provided for sensing the multiplier digits such that if a series of "ones" are sensed in a sequence, the multiplicand will be subtracted in a product accumulator for the first of the series, all subsequent "ones" of the series will be interpreted as "zeros" and the next "zero" following the series of "ones" will be interpreted as a "one" so that the multiplicand will be added in accordance therewith.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
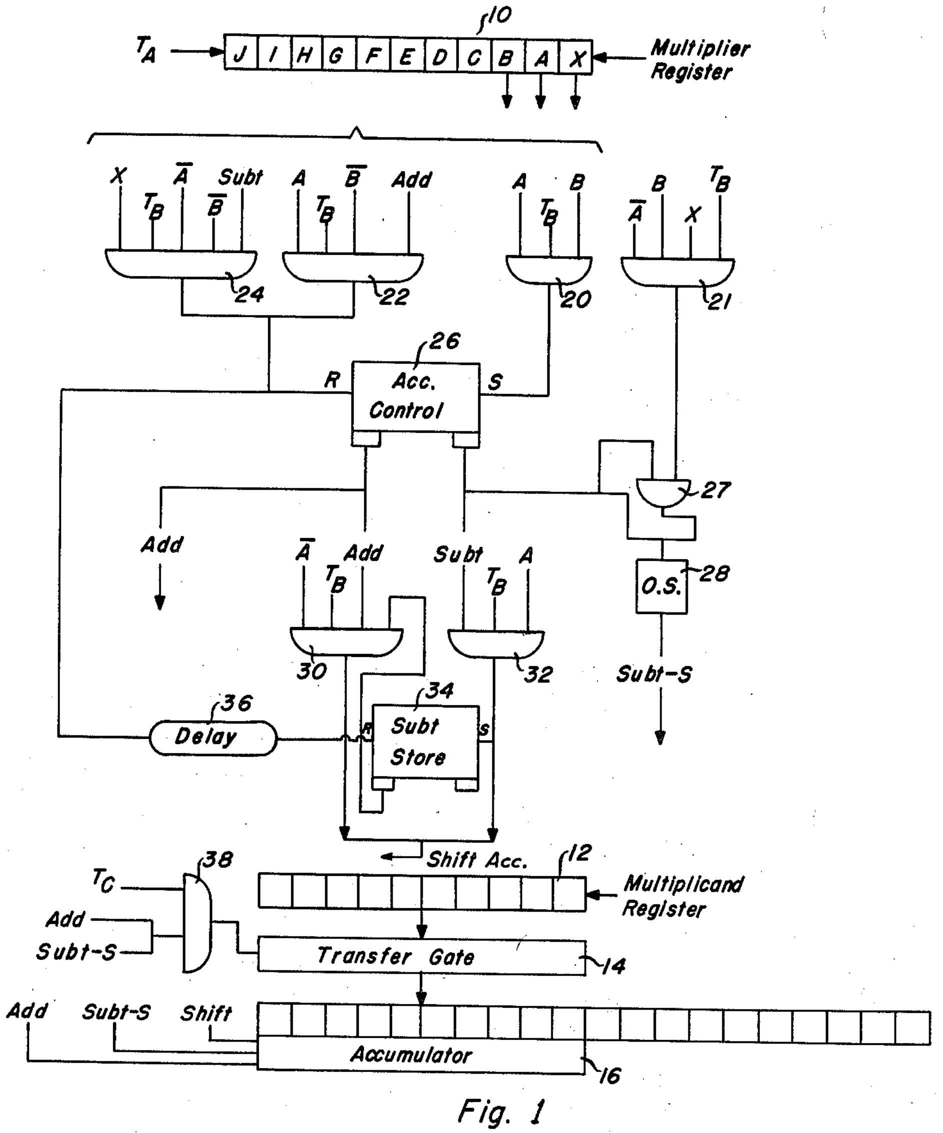
FIGURE 1 is a diagrammatic representation of the invention.

Referring first to FIGURE 1, there is here illustrated the basic elements associated with apparatus for multiplying a pair of binary numbers. The numeral 10 identifies a multiplier register into which appropriate multiplier bits may be inserted by external means, not shown. The register may well take the form of a series of interconnected bistable flip-flops having appropriate coupling circuits between the stages so that the register may be operated in a serial fashion for the purpose of examining one or more bits stored in the register. The multiplication apparatus further includes a multiplicand register 12 which may also be comprised of a series of bistable flip-flops capable of receiving bits from an external source which represent a binary or binary coded multiplicand. A transfer gate indicated generally at 14 is provided for coupling the multiplicand from the register 12 into an accumulator 16. The form to be taken by the transfer gate 14 will depend upon the manner in which the data is to be inserted into the accumulator 16. If the accumulator 16 is a serial accumulator, the multiplicand must be readable out of the register 12 in a serial manner. A representative form of serial accumulator will be found in the copending application of Henry W. Schrimpf, bearing Serial Number 636,256, filed January 27, 1957. In the event that optimum speed of operation is a requirement, a parallel-type accumulator may be used for the accumulator 16 in which event the accumulator may well take the form of the accumulator described in the text by R. K. Richards entitled "Arithmetic Operations in Digital Computers," van Nostrand Company, 1955. The accumulator 16 may also take the form of the accumulator illustrated in the copending application of Roy W. Reach et al. bearing Serial Number 843,719, filed October 1, 1959 now Patent Number 3,003,695. This latter type circuit is sometimes referred to as a parallel-serial-parallel circuit which is characterized by its high speed of operation using a minimum number of components. All of the foregoing accumulator circuits have facilities for performing addition, subtraction and shifting.

In the normal straightforward multiplication operation, wherein the multiplication is carried out by an accumulation of a series of partial products, the contents of the multiplicand are transferred or not into the accumulator in accordance with whether a "one" or a "zero" is sensed at the appropriate sense point in the multiplier. In the process of the examination of each of the multiplier bits, there is a corresponding one-bit shifting of the accumulated partial product in the accumulator.

In order to speed up the rate of operation of the normal multiplication operation, the present invention goes beyond the conventional multiplication type circuit by providing means for sensing more than one multiplier bit at a time. The special multiplier sensing circuit may take the form illustrated in FIGURE 1 wherein a plurality of sensing gates 20, 21, 22 and 24 are provided for purposes of examining the multiplier bits in the multiplier register 10. More specifically, the gate 20 is provided for sensing the presence of a "one" bit in both the A and B positions of the register 10. The gate 21 is provided to sense a bit combination calling for a subtraction in the middle of a multiplication process. The gate 22 is provided to sense the presence of a "one" bit in the A position of the register 10 and a "zero" bit in the B position when an add signal is being stored in the circuitry. The gate 24 provides an output when there is a "one" stored in the X position of the register 10, a "zero" is in the A position of the register 10, a "zero" is in the B position of the register, and when a subtract condition is stored.

The multiplier control circuit also includes an accumulator control flip-flop 26 having a reset input R and a set input S. When the accumulator control flip-flop 26 is in the reset state, the output thereof calls for an add operation. When the flip-flop is in the set state, the output thereof calls for a subtract operation. When the control flip-flop 26 is switched to the subtract state, a one-shot multivibrator 28 is activated to produce a subtract signal Subt—S. The add output from control 26 and the Subt—S output generated by the one-shot 28 are applied to control the operation of the accumulator 16.

The output of the accumulator control flip-flop 26 is also applied to a pair of shift control gates 30 and 32. This shift signal, produced by the operation of either of the gates 30 or 32, is utilized in the accumulator in those instances when no arithmetical operation is being performed within the accumulator.

For purposes of this storing, the presence of a subtract signal, a subtract store flip-flop 34 is provided. This flip-flop is adapted to be reset by the signal used to reset the accumulator control flip-flop 26, the latter signal passing to the flip-flop 34 by way of the delay line 36. The flip-flop 34 is adapted to be set by an output signal from the gate 32, the latter indicating the fact that a subtract condition has been called for.

The transfer gate 14 is arranged to receive a control gating signal by way of a further gate 38, the latter being operated upon the presence of an Add signal or a subtract signal Subt—S and a timing signal $T_B$.

In considering the basic operation of the circuitry illustrated in FIGURE 1, the mathematical operations to be performed should be considered. The conventional generation of a product of two binary numbers is by using the process of step-by-step accumulation of partial products in accordance with the individual bits making up the multiplier. The following is a representative multiplication operation using a conventional multiplication method wherein the multiplicand has a decimal value of 11 and the multiplier has a decimal value of 15. The product has a decimal value of 165.

| | |
|---|---|
| 01011 | Multiplicand (11) |
| 01111 | Multiplier (15) |
| 01011 | Partial Product —1 |
| 01011 | Shift |
| 01011 | Add |
| 100001 | Partial Product —2 |
| 100001 | Shift |
| 01011 | Add |
| 1001101 | Partial Product —3 |
| 1001101 | Shift |
| 01011 | Add |
| 10100101 | Partial Product —4 |
| 010100101 | Shift |
| 00000 | Add |
| 010100101 | Product (165) |

In reviewing the foregoing operation, it will be noted that five separate additions are performed in accordance with the number of bits in the multiplier. In addition to the five addition steps, four separate shifting operations must also be performed in order to generate the partial product. In some types of accumulators associated with data processing equipment, the shifting operation associated with partial product generation may be carried out during the partial product generation so that the partial product will have been shifted at the completion thereof in preparation for the next transfer of the multiplicand. Further, as contemplated in the foregoing, a single bit shift is associated with each of the partial product accumulations.

Upon further examination of the multiplier, it will be noted that the multiplier has four "ones" in a series. The numerical significance of this may be represented a number of different ways. In terms of optimizing a multiplication operation, as contemplated herein, the multiplier may be represented as the decimal number 16—1. When represented in this manner, the multiplication operation may be considerably simplified and the same mathematical multiplication may be represented as follows:

| | |
|---|---|
| 01011 | Multiplicand |
| 1000(—1) | Multiplier |
| —(01011) | Partial Product—1 |
| —(001011) | Shift |
| —(0001011) | Shift |
| —(00001011) | Shift |
| —(000001011) | Shift |
| 01011 | Add |
| 010100101 | Product |

It may be seen from the foregoing that by converting the multiplier into a modified form, it is possible to reduce the number of steps required to carry out the multiplication operation. It will further be apparent that while the shifting operation has been described in connection with a single bit shift, multiple bit shifts may be carried out in accordance with the manner in which the multiplier is modified, as to be discussed more fully hereinafter.

In order for the foregoing principles to be effectively utilized in a data processing system, it is essential that the apparatus must be capable of recognizing those conditions which may be used to advantage in effecting the conversion to a modified number so that the number of operating steps required to effect the multiplication may be minimized.

In considering the operation of FIGURE 1 more specifically, it is assumed first that each of the flip-flops 26 and 34 are switched to their reset state. As the multiplication operation starts, the multiplier will have been inserted into the multiplier register 10 so that the low order bit of the multiplier will be positioned at location A in the register. When in this position, the accumulator control flip-flop 26 will be reset so that the Add output will be active. If the first two bits in th emultiplier register positions A and B are a "one" and "zero" respectively, the gate 22 will be opened at time $T_B$ to indicate that an addition should be performed. At time $T_C$, the gate 38 will be opened and the multiplicand will be transferred from the register 12 through the gate 14 into the accumulator 16 where a partial product will be generated.

Following utilization of the multiplier bit A in control of the multiplication operation, the multiplier register 10 will be shifted one bit so that now the "zero" which was formerly in the B position will be located in the A position and the "one" which was in the A position will be located in the X position. The presence of the "zero" in the A position of the accumulator control flip-flop 26 of the reset state will condition the gate 30 for operation to create the shift signal which is applied to the accumulator 16. Following this operation, the multiplier register will once again be given a one-bit shift. In the event that the bits now residing in positions A and B are both "ones," it is necessary that this portion of the multiplier be modified so that, in effect, the "one" in A position appears as a −1 and the "one" in the B position appears as a "zero." At time $T_B$, the presence of the "one" in the A and B position will be sensed by way of gate 20 and this will be effective to switch the accumulator control flip-flop 26 to the set state so as to activate the subtract output thereof. The appearance of the subtract output on the flip-flop 26 will activate the one-shot multivibrator 28 to produce the signal Subt—S which is applied both to the accumulator 16 and to the transfer gate 14. The multiplicand will thus be transferred into the accumulator and it will be subtracted from the reseult stored therein.

Following this first subtraction operation in the accumulator 16, the shifting of the multiplier register 10 will cause the "one" previously in the B position to be shifted to the A position and then upon this shifting, the gate 32 will sense the presence of this "one" in the A position to create a further shift signal which will shift the accumulator 16. This shifting will continue as long as "ones" are shifted into the A position during each cyclic operation of the apparatus. As soon as a "zero" is shifted into the A position, and immediately following a series of "ones," the apparatus reverts back to its original status by way of a signal created at the gate 24. This gate will be opened to indicate that the first "zero" following this series of "ones" should be interpreted as a "one" provided that another "one" is not following the "zero" in the A position. Thus, with gate 24 operating, the accumulator control flip-flop 26 will be switched back to the reset state and this will create the Add signal which will cause the transfer of the multiplicand through the gate 14 into the accumulator 16, where the same will be added to create a further partial product within the accumulator. At the same time, the subtract store flip-flop 34 will be reset so that upon the receipt of the next "zero" in the A position, a shift signal can be created by way of the gate 30.

Should a "one" follow a "zero" in the A position of the foregoing example, this "zero" will be interpreted as a (−1) by way of the gate 21 passing a signal to gate 27 on the input to the one-shot multivibrator 28. It will be noted that the gate 27 will be open only when the accumulator control 26 is set to the subtract state.

It will thus be seen from the foregoing description that apparatus has been provided for examining the multiplier and converting the multiplier into a modified numerical form having the same basic numerical significance in order to minimize the individual operations that may be required in carrying out the multiplication operation.

Figure 2:
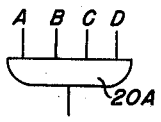
FIGURE 2 is a diagrammatic representation of a portion of FIGURE 1 modified for providing a fast shift.

The realization of greater savings in time can be realized with accumulators utilizing multiple-bit shifts such that the proces may be further speeded up. Thus, using an accumulator as referred to in the above-mentioned Schrimpf application, wherein four bits may be shifted in a single-shift operation, it is possible to create a signal causing such a shift under conditions where, for example, a series of four "ones" are detected in a particular sequence in the multiplier register 10. Such a sensing gate for examing the multiplier register may take the form of the gate 20A which is illustrated in FIGURE 2 wherein if a "one" resides in each of the bit locations A, B, C and D, the −1 may be generated as illustrated in FIGURE 1 and then four shifts generated by way of a "fast shift" in the accumulator. It will thus be apparent that this shifting operation can be directly related to the bit combinations residing in the multiplier.

Figure 3:
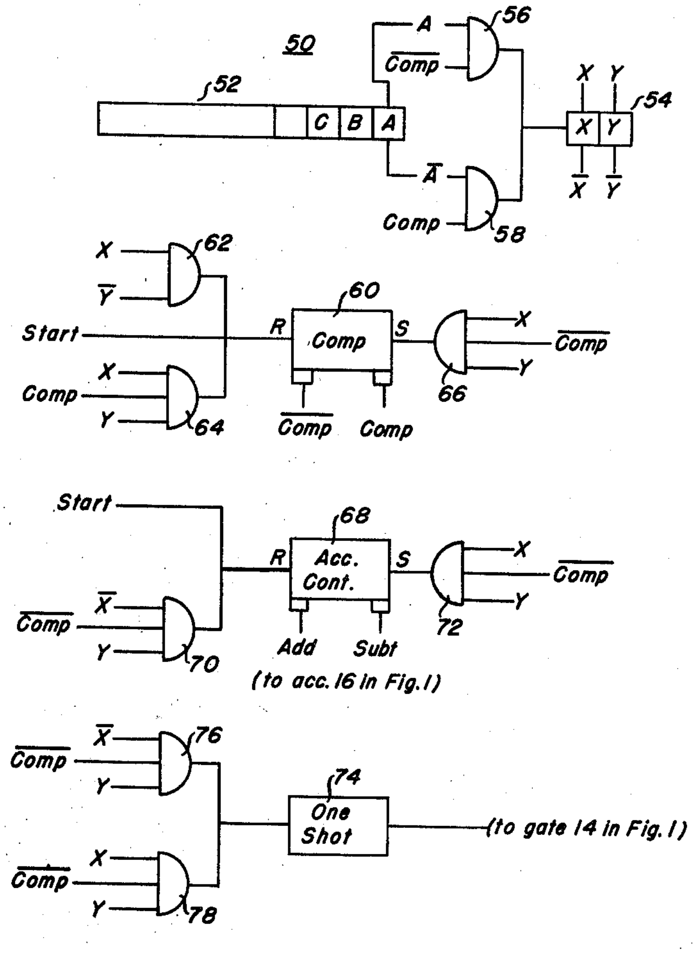
FIGURE 3 illustrates a modified form of logic which may be used to implement the invention.

Referring next to FIGURE 3, there is here illustrated a modified form of the apparatus for implementing the present invention. In this form of the apparatus, the bits that are actually in the multiplier register are arranged to be modified by means positioned within the register. This is to be contrasted with the selective interpreting of the multiplier bits as is accomplished in the apparatus shown in FIGURE 1. The basic elements essential to the operation of FIGURE 3 include a multiplier register 50 which is divided into two sections 52 and 54. Coupled between the A position and the X position of the multiplier register are a pair of gating circuits 56 and 58. The gating circuit 56 is arranged to pass the data shifted out of the position A into the position X without modification. The gate 58 is arranged to complement the data transferred between the A position of the register and the X position of the register.

For determining whether or not a complementing of the multiplier bits is required, a complement flip-flop 60 is provided and has a reset input and the set input. Connected to the reset input are a pair of gating sections 62 and 64, both of which are connected to examine the bits in the X and Y positions of the multiply register 50. The set input for the flip-flop 60 is derived from a gating circuit 66, the latter of which also receives inputs from the X and Y positions of the multiply register 50.

Also included in the circuitry of FIGURE 3 is an accumulator control flip-flop 68. This flip-flop 68 has a reset input which is derived from a gating circuit 70 and a set input which is derived from a gating circuit 72. The gating circuits 70 and 72 are also connected to examine the bits stored in the X and Y positions of the multiply register 50.

An additional circuit for actuating the transfer of the multiplicand to the accumulator is provided in the one-shot multivibrator 74 which is arranged to be activated when either an add or a subtract is to be performed. This one-shot 74 will receive an energizing signal from either of the input gates 76 or 78 when the logic therefor calls for an add or subtract operation.

Considering the operation of the apparatus of FIGURE 3, it should first be noted that the over-all operation in terms of ultimate results will be the same as discussed above in connection with FIGURE 1. When the multiplier is loaded into the multiply register 50, the bits thereof will reside in all positions illustrated, including the low order bit positions X and Y. At the time that these two bits are loaded into the register, the flip-flops 60 and 68 will both be switched to the reset state. Assuming the bits inserted in the X and Y positions are a "zero" and a "one" respectively, the gate 70 on the input of the accumulator control 68 will be operated and effective to maintain the accumulator control flip-flop 68 in the reset state so that the output of the accumulator control flip-flop signifies that an add is to take place. At the same time, the activity flip-flop 74 which calls for the completion of an add or a subtract operation which is set by the flip-flop 68, will receive an input from the gate 76. Thus, the multiplicand will be transferred into the accumulator so that an add operation will be performed. Following this, the accumulator is shifted in preparation for the next cycle.

Assuming next that the first two bits inserted into the register positions X and Y are a "one" and "zero" respectively, the complement and accumulator control flip-flops will both remain in the reset state. However, the activity one-shot 74 will not receive an input signal and the only operation performed will be a shift operation within the accumulator in preparation for the next cycle.

Assuming next that the bits inserted into the positions X and Y of the multiply register 50 are both "ones," the complement flip-flop 60 will be set by way of a signal derived from the input gate 66. It will be noted that this latter gate will become active when the X, Y and $\overline{\text{COMP}}$ signals are all present. At the same time that the complement flip-flop 60 is switched to the set state, the accumulator control 68 will also be switched to the set state by the corresponding input signals which, in this case, are used to activate the gate 72. Further, the gate 78 will be active to pass a signal to the one-shot 74 to have the apparatus perform a subtracting operation with respect to the one bit stored in the Y position of the multiplier register. After the subtract operation has taken place in the last-discussed example, the accumulator will, of course, be shifted in preparation for the next multiplicand insertion, if any.

It is next further assumed that a "one" was inserted in the A position of the multiplier register. Inasmuch as the multiplier register will be shifted immediately after the first subtract operation, the "one" in the X position will be shifted to the Y position, and the "one" in the A position will be blocked by the gate 56 so that, in effect, a "zero" will reside in the X position following the shift. Inasmuch as the complement flip-flop 60 is in the set state, the presence of a "zero" and "one" in the X and Y positions will not produce either an add or a subtract operation. Consequently, the only operation produced for this particular shift in the multiplier will be a shift in the accumulator.

It will be apparent that as long as a series of "ones" resides in the sequential positions A through *n*, this shifting operation will continue to take place. As soon as a "zero" is shifted out of the A position, it will be apparent that this "zero" will be effective to activate the gate 58 so that a signal can pass therethrough. This will result in a "one" being inserted into the X position of the register. When this occurs, a signal will be created on the gate 62 so that it will provide a signal to reset the complement flop 60. At the same time that this operation is going on, the normal shift will be taking place in the accumulator. The multiplier will also be shifted so that the "one" inserted in the X position will now reside in the Y position. Assuming a further "zero" is inserted into the X position, this combination of signals will be effective by way of the gate 70 to reset the accumulator control 68 and also activate the one-shot 74 by way of the gate 76. Should a "one" have been inserted in the X position instead of a "zero," it will be apparent that the accumulator control 68 will be switched to the subtract state and the gate 78 will be open to supply an activating signal to the one-shot 74 so that a subtract operation will be performed.

It will be apparent from a review of the foregoing operation that the minimization which is achieved in time by the apparatus of FIGURE 1 is also achieved in the last-described apparatus. Thus, the multiplier is, in effect, modified into a form such that a minimum number of mathematical steps must be performed in order to effect the desired multiplication.

It will be further apparent that the principles of the present invention are applicable to any type of arithmetical manipulation wherein the modification of one of the operands can be utilized to cut down the number of steps to be performed in the manipulation.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. An apparatus for multiplying binary numbers comprising a multiplier storage register, a multiplicand storage register, an accumulator having an add subtract network and product storage means, means connected to said accumulator to incrementally shift the product stored in said accumulator, multiplier sensing means connected to said multiplier storage register to sequentially sense the three lowest order stages thereof, first logic means including means to detect the occurrence of a binary one in the second and third lowest order stages of said multiplier storage register, second logic means including means to detect the occurrence of a binary one in the second lowest order stage of said multiplier storage register and a binary zero in the third lowest order stage thereof, a bistable device having set and reset input and output lines, means connecting said first logic means to the input side of said bistable device, means connecting said second logic means to the reset input side of said bistable device, means coupling the reset output side of said bistable device to said accumulator to initiate an add and shift operation in said accumulator in response to the actuation of said second logic means, means including a single pulse producing circuit coupling the set output side of said bistable device to said accumulator to initiate a subtract and shift operation in said accumulator in response to the actuation of said first logic means, and means including said bistable device coupled to said accumulator to initiate a shift operation in said accumulator without adding or subtracting said multiplicand for each binary one sensed in said multiplier storage register following the sensing of the first of a series of binary ones.

2. Apparatus for multiplying binary numbers comprising a multiplier storage register, a multiplicand storage register, an accumulator having an add and subtract network and product storage means, means connected to said accumulator to shift in increments of one of the products stored therein, means for sequentially sensing the low order bit positions of said multiplier storage register, first logic means operatively connected to said multiplier sensing means and actuated upon the detection of a first pair of bits of like type, second logic means operatively connected to said multiplier sensing means and actuated upon the detection of a pair of bits of unlike type, accumulator control means connected to said accumulator and being adapted to initiate an add or subtract operation in said accumulator, said accumulator control means further comprising a register operatively connected to said first and second logic means, means connecting said accumulator control means to said multiplicand storage register to transfer the contents of the multiplicand register to said accumulator, means connected to said accumulator to shift said accumulator after each add or subtract operation in said accumulator, and means to shift said accumulator without adding or subtracting said multiplicand for each bit of said like type following the sensing of the first of a series of bits of like type.

References Cited in the file of this patent

UNITED STATES PATENTS

| | | |
|---|---|---|
| 2,590,599 | Evans | Mar 25, 1952 |
| 2,936,115 | Alexander et al. | May 10, 1960 |
| 3,069,085 | Coopper | Dec. 18, 1962 |